United States Patent
King et al.

(10) Patent No.: US 6,501,374 B1
(45) Date of Patent: Dec. 31, 2002

(54) SECONDARY SEAT BELT WARNING SYSTEM

(75) Inventors: Daniel M. King, Northville; Keith Z. Doorenbos, Farmington Hills; Scott Howard Gaboury, Ann Arbor; Steven Yellin Schondorf, Dearborn; Thomas M. McQuade, Ann Arbor; Thomas A. Spoto, Birmingham, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/715,236

(22) Filed: Nov. 17, 2000

(51) Int. Cl.$^7$ ................................................. B60Q 1/00
(52) U.S. Cl. .............................. 340/457.1; 340/425.5; 340/457; 340/438; 340/459; 340/660
(58) Field of Search ..................... 340/425.5, 457.1, 340/457, 438, 459, 660

(56) References Cited

U.S. PATENT DOCUMENTS

| | | | |
|---|---|---|---|
| 3,875,556 A | 4/1975 | Beaird | 340/457.1 |
| 3,935,470 A | 1/1976 | Cake | 180/270 |
| 3,967,237 A | 6/1976 | Jenne | 340/457.1 |
| 4,849,733 A | 7/1989 | Conigliaro et al. | 340/457.1 |
| 5,076,609 A | 12/1991 | Park | 280/804 |
| 5,483,221 A | 1/1996 | Mutter et al. | 340/457.1 |
| 5,596,312 A | 1/1997 | Fowler et al. | 340/457.1 |
| 5,714,930 A | 2/1998 | McKinney, Jr. | 340/468 |
| 5,760,684 A | 6/1998 | Orbach | 340/457.1 |
| 5,780,937 A | 7/1998 | Kong | 307/10.1 |
| 6,002,325 A | 12/1999 | Conaway | 340/384.1 |
| 6,215,395 B1 * | 4/2001 | Slaughter et al. | 340/457.1 |
| 6,278,358 B1 * | 8/2001 | Spoto et al. | 340/425.5 |

FOREIGN PATENT DOCUMENTS

WO    9955560    11/1999

* cited by examiner

Primary Examiner—Daryl Pope
(74) Attorney, Agent, or Firm—David B. Kelley

(57) ABSTRACT

A secondary seat belt warning system for a motor vehicle includes at least one control module for activating at least one secondary warning signal. The secondary seat belt warning system also includes a driver seat belt sensor for producing an input signal indicative of a state of a driver seat belt between a buckled and unbuckled condition. The secondary seat belt warning system includes at least one passenger seat belt sensor for producing an input signal indicative of a state of at least one passenger seat belt between a buckled and unbuckled condition. The at least one control module communicates with the driver seat belt sensor and the at least one passenger seat belt sensor for activating the at least one secondary warning signal to alert a corresponding occupant of the motor vehicle if the state of at least one of the driver seat belt and the at least one passenger seat belt is the unbuckled condition.

20 Claims, 4 Drawing Sheets

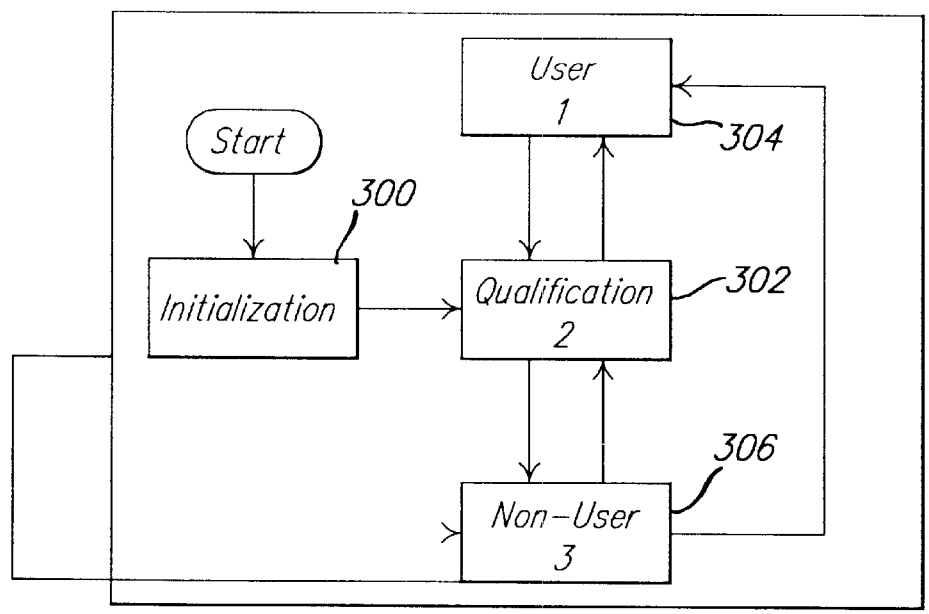
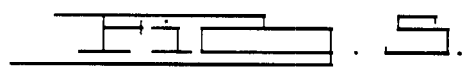
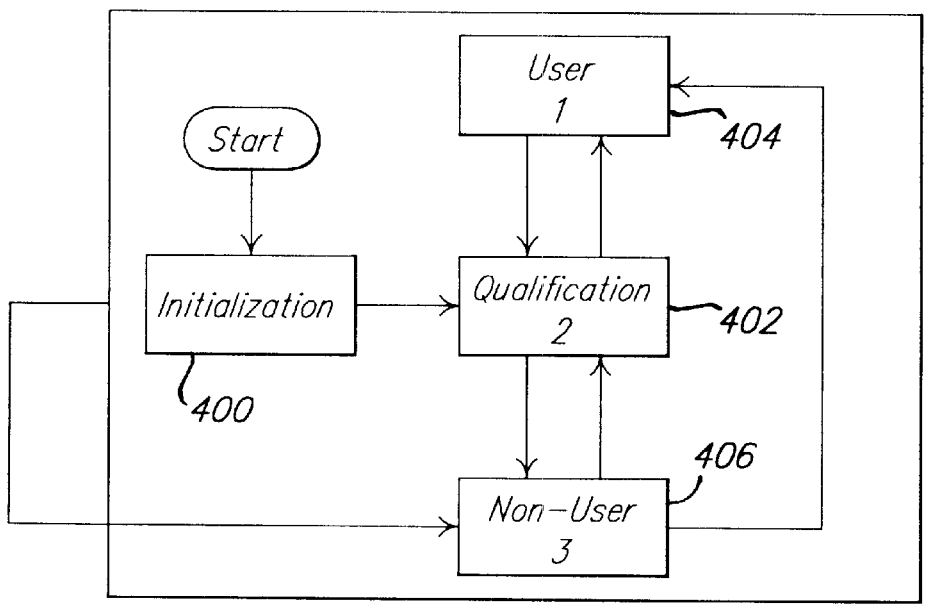
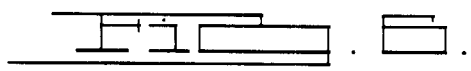

SECONDARY SEAT BELT WARNING SYSTEM

BACKGROUND OF THE INVENTION

1. Field of the Invention

The present invention relates generally to seat belt warning systems for vehicles and, more specifically, to a secondary seat belt warning system for a motor vehicle.

2. Description of the Related Art

It is known that motor vehicles such as automotive vehicles often include seat belt warning systems for reminding an occupant of the vehicle that their seat belt is unbuckled. Typically, when the vehicle ignition is turned to a "run" or "on" position, an audible chime and visible warning light will turn on for a predetermined amount of time to alert, or remind, the occupant to buckle or fasten their seat belt. If their seat belt is already buckled, neither the chime nor the light will turn on. The audible chime will typically only sound for a few seconds and the visible warning light will typically flash for a short period of time or remain illuminated for approximately ten to sixty seconds. After these relatively short time durations have expired, the warnings will turn off and remain off, regardless of whether the seat belt is buckled or unbuckled, until the initial ignition "run" position is reactivated.

An example of a seat belt usage indicating system is disclosed in U.S. Pat. No. 5,483,221 to Mutter et al. In this patent, seat belts in a motor vehicle are monitored, and a reminder is initiated in response to a belt or restraint sensor indicating an engaged or nonengaged state of a seat belt or restraint, a vehicle sensor indicating when the vehicle is in use, an annunciator controllably producing a reminder, and an electronic control controlling the annunciator. The reminder is produced when the seat restraint is in a nonengaged state after having been in an engaged state while the vehicle is in use.

It is also known to provide a secondary seat belt warning system for a motor vehicle. An example of such a system in disclosed in copending application Serial No. 09/448,352, filed Jan. 20, 2000, entitled "SECONDARY SEAT BELT WARNING SYSTEM". In this application, a secondary seat belt warning system includes a control module for activating at least one output warning signal in response to receiving a plurality of predetermined control feedback input signals. The secondary seat belt warning system includes an ignition switch connected to the control module for producing an input signal to the control module indicative of a state of a vehicle ignition between an "off" position and an "on" position. The secondary seat belt warning system also includes a seat belt sensor connected to the control module for producing an input signal to the control module indicative of a state of the seat belt between a buckled and unbuckled condition. The secondary seat belt warning system further includes a vehicle speed sensor connected to the control module for producing an input signal to the control module in response to the vehicle speed sensor measuring a predetermined threshold speed of the vehicle. Finally, the secondary seat belt warning system includes a seat belt indicator system connected to the control module for producing an output signal in response to the control module receiving an input signal from the seat belt sensor in the unbuckled condition and an input signal from the vehicle speed sensor above the predetermined threshold, whereby the output signal triggers at least one of an audible and visible indicator to alert the occupant of the vehicle of the unbuckled condition of the seat belt.

Although the current secondary seat belt warning system reminds the occupant to buckle their seat belt in addition to the primary warning, these secondary warnings are a "once per drive cycle" event typically at the start-of each trip (key cycle), and this limitation exists due to the inability to determine a seat belt user or a seat belt nonuser. Another disadvantage is that the secondary seat belt warning system does not allow the occupant to change its declaration as a seat belt user or non-user without the engine being turned off. Another disadvantage is that the secondary seat belt warning system is available only once in a drive cycle.

It is desirable to provide a secondary seat belt warning system that identifies a vehicle occupant as a seat belt user or a non-user. It is also desirable to provide a secondary seat belt warning system that combines occupant seat occupancy detection and occupant belt use monitoring to add occupant passenger seat belt reminder warnings. It is further desirable to provide a secondary seat belt warning system with repeatable warnings to warn occupants throughout the duration of a drive cycle or trip. Therefore, there is a need in the art to provide a secondary seat belt warning system that meets these desires.

SUMMARY OF THE INVENTION

Accordingly, the present invention is a secondary seat belt warning system for a. motor vehicle including at least one control module for activating at least one secondary warning signal. The secondary seat belt warning system also includes a driver seat belt sensor. for producing an input signal indicative of a state of a driver seat belt between a buckled and unbuckled condition. The secondary seat belt warning system includes at least one passenger seat belt sensor for producing an input signal indicative of a state of at least one passenger seat belt between a buckled and unbuckled condition. The at least one control module communicates with the driver seat belt sensor and the at least one passenger seat belt sensor for activating the at least one secondary warning signal to alert a corresponding occupant of the motor vehicle if the state of at least one of the driver seat belt and the at least one passenger seat belt is the unbuckled condition.

One advantage of the present invention is that a secondary seat belt warning system is provided for a motor vehicle. Another advantage of the present invention is that the secondary seat belt warning system monitors the seat belt use status of a vehicle occupant to dynamically determine if the occupant is a seat belt user or a seat belt non-user. Yet another advantage of the present invention is that a method is provided for monitoring an occupant's seat belt and to assign them as a seat belt user or non-user and to change the assignment at any time during a drive cycle such that secondary warnings can be provided to seat belt "users" at any time during a drive cycle, while not providing secondary warnings to seat belt "non-users". Still another advantage of the present invention is that the secondary seat belt warning system provides secondary warnings whenever an occupant seat belt is unbuckled independent of when in the drive cycle it is unbuckled. A further advantage of the present invention is that the secondary seat belt warning system includes a combined driver and passenger occupant reminder feature which subtly reminds the driver and front passenger seat occupant to buckle their seat belts, in the event that they have forgotten to buckle-up at the beginning of a drive cycle. Yet a further another advantage of the present invention is that the secondary seat belt warning system includes a repeatable secondary warning feature which subtly reminds the driver and front passenger seat occupant to buckle their seat belts in the event that they have forgotten to buckle-up at any point during an extended trip or drive cycle.

Other features and advantages of the present invention will be readily appreciated, as the same becomes better understood, after reading the subsequent description when considered in connection with the accompanying drawings.

BRIEF DESCRIPTION OF THE DRAWINGS

FIG. 5 is a logic diagram of another method, according to the present invention, of classifying a driver occupant as a seat belt user or non-user for the secondary seat belt warning system of FIG. 3.

FIG. 6 is a logic diagram of a yet another method, according to the present invention, of classifying a passenger occupant as a seat belt user or non-user for the secondary seat belt warning system of FIG. 3.

DESCRIPTION OF THE PREFERRED EMBODIMENT(S)

Figure 1:
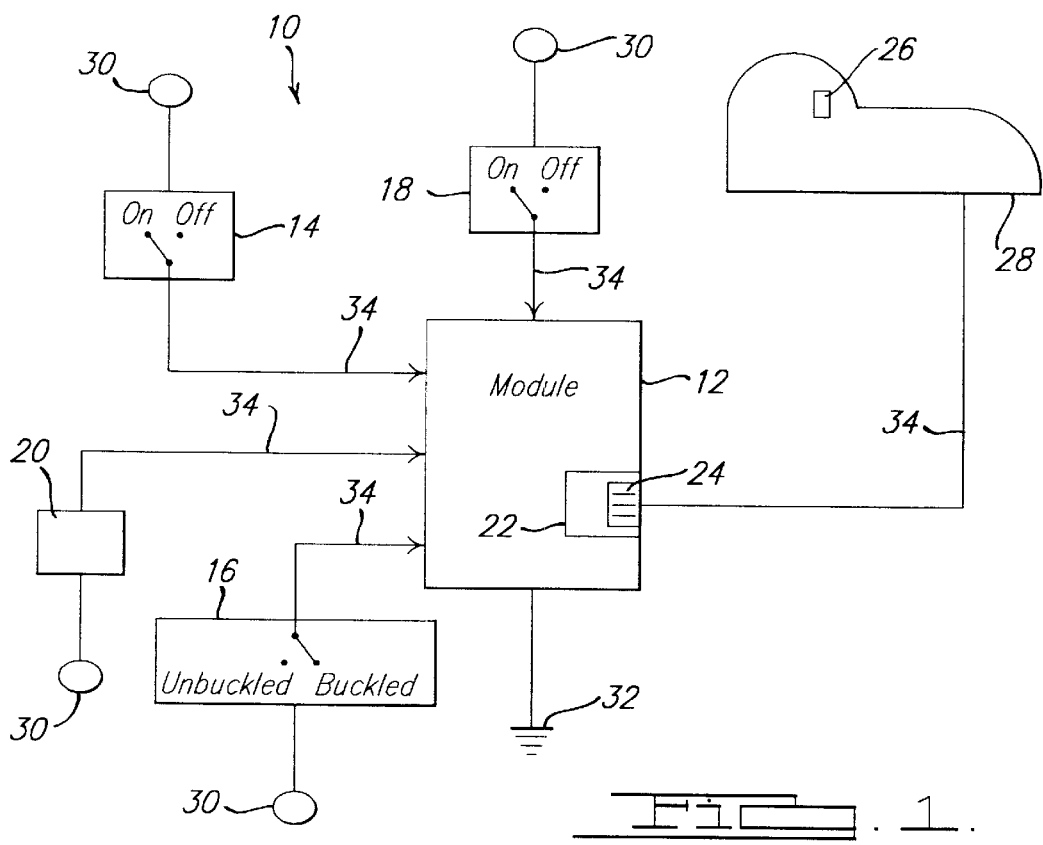
FIG. 1 is a schematic view of a secondary seat belt warning system, according to the present invention.

Referring to the drawings and in particular FIG. 1, one embodiment of a secondary seat belt warning system 10 for alerting an occupant of a motor vehicle (not shown) when a seat belt is unbuckled, according to the present invention, is shown. The secondary seat belt warning system 10 includes a control module 12 for activating audible and visible output signals in response to receiving a plurality of predetermined control feedback input signals. The secondary seat belt warning system 10 also includes a plurality of input devices for generating the input signals. The input devices include a headlamp switch 14, which provides an input signal for programming the control module 12 between an enabled and disabled status, as will be discussed in greater detail herein below. The input devices include a seat belt sensor 16, which provides an input signal to the control module 12 indicating whether the seat belt (not shown) is in a buckled or unbuckled state. That is, each seat belt within the motor vehicle includes a female member or buckle (not shown) for receiving a male member or latch plate (not shown) within the buckle, a latch plate (not shown) and a locking mechanism (not shown) to lock and unlock the seat belt, as is commonly known in the art. The input devices include an ignition switch 18, which provides an input signal to the control module 12 indicating when a vehicle ignition (not shown) transitions from an "off" position to an "on" position, i.e. powered operation of the vehicle. The "on" position is typically when the ignition 18 is in either the engine start condition or the run condition, as are commonly known in the art. Additionally, the input devices include a vehicle speed sensor 20, which provides an input signal to the control module 12 indicative of the speed of the motor vehicle, typically measured in miles per hour.

The secondary seat belt warning system 10 also includes an output device such as a seat belt indicator system 22. The seat belt indicator system 22, according to the present invention, is integrated into the control module 12 for activating an audible indicator device 24, such as a loudspeaker, and a visible indicator device 26, such as a seat belt warning light. The seat belt indicator system 22 may also be integrated into a dash cluster 28 of the motor vehicle. The audible indicator 24 is integral with the seat belt indicator system 22 and the control module 12 and the visible indicator 26 is mounted within the dash cluster 28 of the motor vehicle, which is conventional and known in the art.

Finally, the control module 12 and each of the input and output devices 14 through 26 are powered by a vehicle battery/fuse box system 30 and the secondary seat belt warning system 10 is grounded at 32 to a frame (not shown) of the motor vehicle. It should be appreciated that the input and output devices 14 through 26 are connected to the control module 12 and battery/fuse box system 30 via electrical connectors 34.

Figure 2:
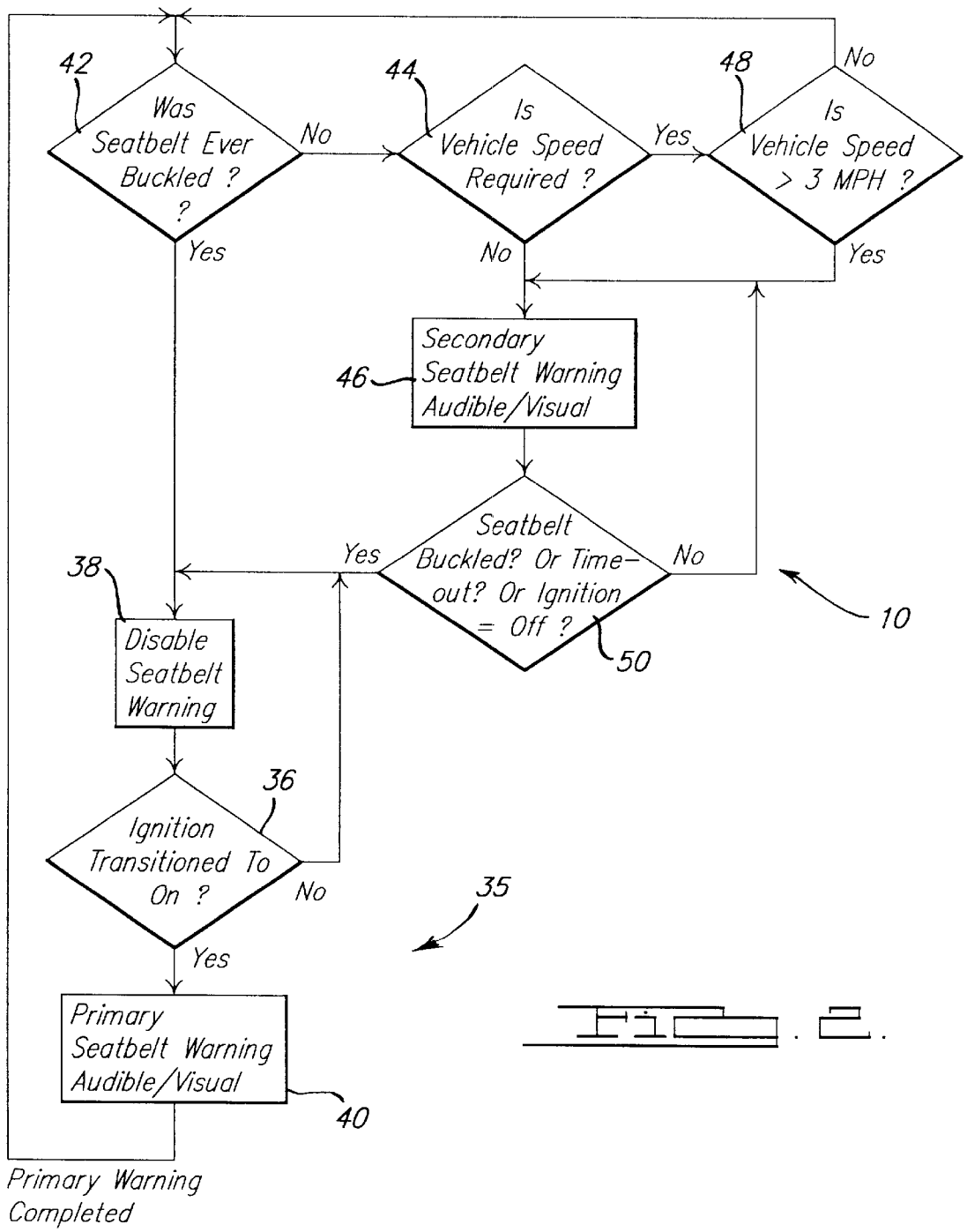
FIG. 2 is a flow diagram of the operation of a primary seat belt warning system and the secondary seat belt warning system of FIG. 1.

In operation, the secondary seat belt warning system 10 is a supplemental warning system that augments a primary seat belt warning system 35 as illustrated in FIG. 2. Referring to FIG. 2, in the primary seat belt warning system 35, when the ignition switch 18 is turned to the "on" position, an input signal is transmitted to the control module 12. An input signal is also transmitted to the control module 12 from the seat belt sensor 16. If the seat belt sensor 16 transmits a signal indicative of a buckled seat belt, the seat belt indicator 22 remains inactive, i.e. no audible or visible indicator 24, 26 is triggered. If the seat belt sensor 16 transmits a signal indicative of an unbuckled seat belt, the control module 12 activates the audible indicator 24 of the seat belt indicator 22 to trigger an audible chime for approximately six seconds. Simultaneously, the control module 12 activates the visible indicator 26 of the seat belt indicator 22 to trigger the seat belt warning light "on" for approximately sixty seconds. The primary seat belt warning system 35 is deactivated after the prescribed time intervals, regardless of whether the seated occupant buckles the seat belt or not.

Once the primary seat belt warning system 35 is deactivated or completed, if the seat belt is still not detected in the buckled condition by the seat belt sensor 16, then the secondary seat belt warning system 10 is activated. First, the seat belt sensor 16 detects whether the seat belt is in the buckled or unbuckled condition. If the seat belt sensor 16 indicates a signal indicative of a buckled seat belt, the seat belt indicator 22 remains inactive and the audible and visible indicators 24 and 26 remain off. However, if the control module 12-receives a signal from the seat belt sensor 16 indicative of an unbuckled seat belt, the control module 12 detects whether there is an input signal from the vehicle speed sensor 20 in the motor vehicle. If the control module 12 does not receive an input signal from the vehicle speed sensor 20, i.e. the motor vehicle is not equipped with a vehicle speed sensor, the secondary seat belt warning system 10 is activated and the seat belt indicator 22 in the control module 12 is actuated. First, the audible indicator 24 will transmit an intermittent chime at 240 rep/min at a frequency of 740 Hz. Second, the visible indicator 26 will display the seat belt warning light in the dash cluster 28. The seat belt warning light will also intermittently flash, simultaneously, with the audible chime at 240 rep/min. Alternatively, the seat belt warning light may illuminate continuously during the audible chime.

However, if the secondary seat belt warning system 10 and the motor vehicle do include the vehicle speed sensor 20, the control module 12 will receive an input signal from the vehicle speed sensor 20 to determine whether to activate the secondary seat belt warning system 10. If the control module 12 receives an input signal from the vehicle speed sensor 20, which exceeds a vehicle speed threshold of three miles per hour, the secondary seat belt warning system 10 is activated and the seat belt indicator 22 is actuated. Again, the audible indicator 24 will transmit an intermittent chime at 240 rep/min at a frequency of 740 Hz and the visible indicator 26 will display the seat belt warning light in the dash cluster 28.

The secondary seat belt warning system 10 is deactivated only when one of three conditions is satisfied. First, the secondary seat belt warning system 10 will be deactivated if the control module 12 receives a signal from the ignition switch 18 indicating that the ignition has been switched to the "off" position. Second, the secondary seat belt warning system 10 will be deactivated if the control module 12 receives a signal from the seat belt sensor 16 indicating that the seat occupant has buckled their seat belt. Third, the secondary seat belt warning system 10 will be deactivated after five minutes have elapsed since initial activation.

Finally, if the seat occupant buckles their seat belt prior to the secondary seat belt warning system 10 being activated, the secondary seat belt warning system 10 will remain inactive until the proper conditions are met and the predetermined signals are received by the control module 12, as described above, on the next ignition cycle from the "off" position to the "on" position. Additionally, if the seat occupant buckles and then unbuckles their seat belt, the secondary seat belt warning system 10 will not provide a warning after the seat belt is unbuckled until the next ignition cycle.

Referring to FIG. 2, a method, according to the present invention, of producing a seat belt indicator 22 indicative of an unbuckled condition of a vehicle seat belt (not shown) by the primary seat belt warning system 35 and the secondary seat belt warning system 10 is shown. The method begins in diamond 36 by the ignition switch 18 detecting a state of the vehicle ignition between an off position and an on position. It should be appreciated that the ignition switch 18 may be programmed to detect between an "accessory" position and a "start" position as well. If the ignition switch 18 detects the vehicle ignition in an off position, the method advances to block 38. In block 38, the primary seat belt warning system 35 is disabled and neither the audible indicator 24 nor visible indicator 26 will be activated.

If the ignition switch 18 and control module 12 detect the vehicle ignition in the on position, the method advances to block 40. In block 40, the primary seat belt warning system 35 is activated. If the seat belt sensor 16 and the control module 12 detect the state of the vehicle seat belt in the unbuckled condition, the audible indicator 24 and visible indicator 26 are activated, as previously described. Again, in the preferred embodiment of the present invention, the audible indicator 24 produces a chime for approximately six seconds and the visible indicator 26 simultaneously produces a steady seat belt warning light for approximately sixty seconds.

From block 40, once the primary seat belt warning system 35 is completed, the method advances to diamond 42 to determine whether the seat belt was ever buckled. In diamond 42, if the seat belt has been buckled, the method advances to block 38 and both the primary seat belt warning system 35 and the secondary seat belt warning system 10 are disabled and neither the audible indicator 24 nor visible indicator 26 are activated. If the seat belt sensor 16 has not detected the seat belt in the buckled condition, the method advances to diamond 44.

In diamond 44, the secondary seat belt warning system 10 and control module 12 determine if a vehicle speed sensor 20 is present in the secondary seat belt warning system 10. In other words, the secondary seat belt warning system 10 may operate with or without the presence of the vehicle speed sensor 20. If the control module 12 does not detect the presence of the vehicle speed sensor 20, the method advances to block 46 to automatically activate the secondary seat belt warning system 10, as will be further described below. If, however, the control module 12 does detect the presence of the vehicle speed sensor 20, the method advances to diamond 48. In diamond 48, the vehicle speed sensor 20 and control module 12 detect whether the speed of the motor vehicle has exceeded the predetermined threshold speed of three miles per hour. If the speed of the motor vehicle is less than three miles per hour, the method advances to diamond 42 to initiate the method of detecting whether the seat belt is in the buckled or unbuckled condition again. However, if the speed of the motor vehicle is greater than or equal to three miles per hour, the method advances to block 46.

In block 46, the seat belt indicator 22 is activated to produce an audible signal from the audible indicator 24 and a visible signal from the visible indicator 26. In block 46, the audible indicator 24 will transmit an intermittent chime at 240 rep/min at a frequency of 740 Hz and the visible indicator 26 will display the seat belt warning light. As previously discussed, the seat belt warning light may be either constantly illuminated or intermittently flashed, simultaneously, with the audible chime at 240 rep/min.

Finally, the method advances from block 46 to diamond 50 to determine whether one of the three conditions for deactivation of the secondary seat belt warning system 10 has been satisfied, as previously described herein above. If one of the conditions for deactivation has not been satisfied, the method recycles to block 46 for the activation of the seat belt indicator system 22. If one of the conditions for deactivation has been satisfied, the method advances to block 38 and the secondary seat belt warning system 10 is disabled.

The secondary seat belt warning system 10 may also be enabled and disabled through vehicle operator programming. The method uses the headlamp switch 14 and the seat belt sensor 16 to toggle the secondary seat belt warning system 10 between an enabled and a disabled status as follows. First, start with the ignition switch 18 in the "off" position and the driver's seat belt unbuckled. Next, turn the ignition switch 18 to the "run" position. The primary seat belt warning system 10 will trigger the visible indicator 26 on. After the visible indicator 26 turns off, approximately one minute, buckle and then unbuckle the driver's seat belt three times, ending in an unbuckled state. Then, turn on the headlamp switch 14 and turn off the headlamp switch 14. Again, buckle and unbuckle the driver's seat belt three times, ending in the unbuckled state. The two cycles of buckling and unbuckling of the seat belt must occur within sixty seconds of completion of the primary warning system or the operator must start the programming method from the beginning. After the final unbuckled state has been reached, the visible indicator 26 will be illuminated for approximately three seconds. After the visible indicator 26 turns off, buckle and then unbuckle the driver's seat belt one time. At this stage, the secondary seat belt warning system 10 will be enabled if it is currently disabled, or it will be disabled if it is currently enabled. If the seat belt is not buckled and unbuckled within ten second of the visible indicator 26 turning off, the programming will end and the status will remain unchanged.

Confirmation of the secondary seat belt warning system 10 being enabled is provided to the vehicle operator by flashing the visible indicator 26 four times per second for three seconds, followed by three seconds with the visible indicator 26 off, then followed by flashing the visible indicator 26 four times per second for three seconds again. Confirmation of the secondary seat belt warning system 10 being disabled is provided to the operator by flashing the visible indicator 26 four times per second for three seconds only. Programming of the secondary seat belt warning system 10 is automatically exited after completion of the confirmation. It should be appreciated that any of the predetermined cycle times of the audible and visible indicators 24 and 26 may vary as well as the threshold speed set by the vehicle speed sensor 20 without varying from the scope of the invention.

Figure 3:
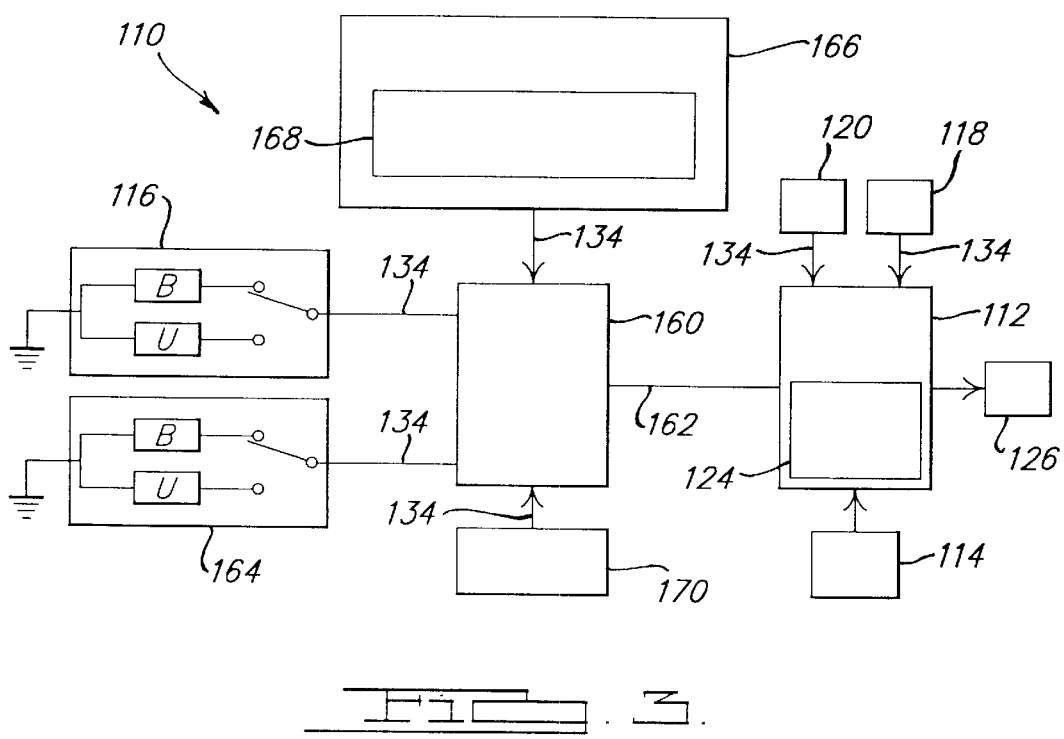
FIG. 3 is a diagrammatic view of another embodiment, according to the present invention, of the secondary seat belt warning system of FIG. 1.

Referring to FIG. 3, another embodiment, according to the present invention, of the secondary seat belt warning system 10 is shown. Like parts of the secondary seat belt warning system 10 have like reference numerals increased by one hundred (100). In this embodiment, the secondary seat belt warning system 110 includes a driver seat belt sensor 116 and a restraint control module (RCM) 160 electrically connected via connectors 134 to the driver seat belt sensor 116 to read or sense the front driver occupant seat belt status as buckled (B) or unbuckled (U), corresponding to high current and low current, respectively. The secondary seat belt warning system 110 also includes a generic electronic module (GEM) 112 electrically connected to the restraint control module 160 via a single wire interface 162. The generic electronic module 112 provides the front driver occupant secondary warnings by monitoring vehicle speed via a vehicle speed sensor 120, ignition status via an ignition switch 118, and a driver occupant seat belt status via the driver seat belt sensor 116. The generic control module 112 controls a seat belt lamp or visible indicator 126 and a seat belt chime or audible indicator 124 to provide secondary warnings to the occupant. It should be appreciated that the ignition status via the ignition switch 118 is an input into the generic electronic module 112. It should also be appreciated that the generic electronic module 112 includes the logic for providing the primary (FMVSS) warnings and the secondary warnings. It should further be appreciated that the generic electronic module 112 could be eliminated and that the restraint control module 160 contain the logic and communicate with the vehicle speed sensor 120 and the indicators 122 and 124 via a communications bus (not shown) of the vehicle.

The secondary seat belt warning system 110 may include a passenger seat belt sensor 164 electrically connected to the restraint control module 160 via connectors 134 to read or sense the front passenger occupant seat belt status as buckled (B) or unbuckled (U). The secondary seat belt warning system 110 may also include an occupant classification system (OCS) 166 electrically connected to the restraint control module 160 via connectors 134. The occupant classification system 166 includes a passenger seat occupancy sensor 168, for example a weight sensor, to determine if the front seat is occupied and the class of occupant (i.e., small, large), for example based on the weight of the occupant. The restraint control module 160 monitors both the occupant classification system 166 and both seat belt sensors 116 and 164 to create a logically combined seat belt warning (on/off) signal to the generic electronic module 112 to remind both occupants to buckle up. The generic control module 112 receives the signal to activate either one or both the visual indicator 126 and the audible indicator 124 to provide secondary warnings to the occupants. It should be appreciated that passenger occupant reminder or secondary warnings are only provided when a passenger occupant is actually present in the front passenger occupant seat as indicated by the passenger seat occupancy sensor 168. It should also be appreciated that the secondary seat belt warning system 110 provides secondary warnings only after the primary warnings are completed and continually reminds the driver and/or passenger that their seat belt is unbuckled by intermittently sounding a chime and illuminating the seat belt warning lamp in the instrument cluster once the vehicle speed has exceeded a predetermined speed of 3 mph. It should further be appreciated that the secondary seat belt warning system 110 may include a test tool (not shown) communicating with the restraint control module 160 via a diagnostic link 170 to allow diagnosing of the secondary seat belt warning system 110.

The secondary seat belt warning system 110 may include a vehicle operator programming method, according to the present invention, to disable the driver or passenger occupant secondary warnings for occupants who do not wish to have occupant secondary warnings provided. The method uses the seat belt sensors 116 and 164 to toggle the secondary seat belt warning system 110 between an enabled and disabled status. The method enables or disables the secondary warnings according to the subsequent steps. First, the method includes the step of monitoring the ignition off via the ignition switch 118 and the driver and passenger seat belts unbuckled via the sensors 116 and 164. The method includes the step of determining that the ignition switch 118 has transitioned from ignition off to run. The method includes the step of waiting until the visual indicator 122 turns off, which is a predetermined time period such as approximately one minute. The method includes the step of buckling and then unbuckling the driver or passenger occupant seat belt a predetermined number of times, for example nine, ending in the unbuckled state and in a predetermined time period. such as sixty seconds. The method illuminates an airbag warning lamp (not shown) for a predetermined time period such as three seconds. After the airbag warning lamp turns off, the method includes the step of buckling and then unbuckling the seat belt again which will enable the secondary warnings if they are currently disabled and disable the secondary warnings if they are currently enabled.

The method includes the step of confirming enabling of the secondary warnings by flashing the airbag warning lamp a predetermined number of times such as four per second for a predetermined time period such as three seconds, followed by a predetermined time period such as three seconds with the airbag warning lamp off, then followed by flashing the airbag warning lamp a predetermined number of times such as four per second for a predetermined time period such as three seconds. The method also includes the step of confirming disabling of the secondary warnings by flashing the airbag warning lamp a predetermined number of times such as four per second for a predetermined time period such as three seconds. It should be appreciated that the programming method of the secondary seat belt warning system 110 is automatically exited after completion of the confirmation. It should also be appreciated that the programming method of the secondary seat belt warning system 110 will automatically exit without changing its enable status if the last buckle and unbuckle step does not occur within a predetermined time period such as ten seconds. It should further be appreciated that performing the above steps using only the driver buckle will indefinitely enable/disable the driver secondary warnings and performing the above steps using only the passenger buckle will indefinitely enable/disable the passenger secondary warnings. It should yet further be appreciated that only one "side" (driver or passenger) can be enabled/disabled at-a-time and any activity on the passenger buckle while programming the driver side will abort or terminate the programming sequence and any activity on the driver buckle while programming the passenger side will abort or terminate the programming sequence. It should still further be appreciated that the programming feedback confirmation may be given on the visual indicator 122.

Figure 4:
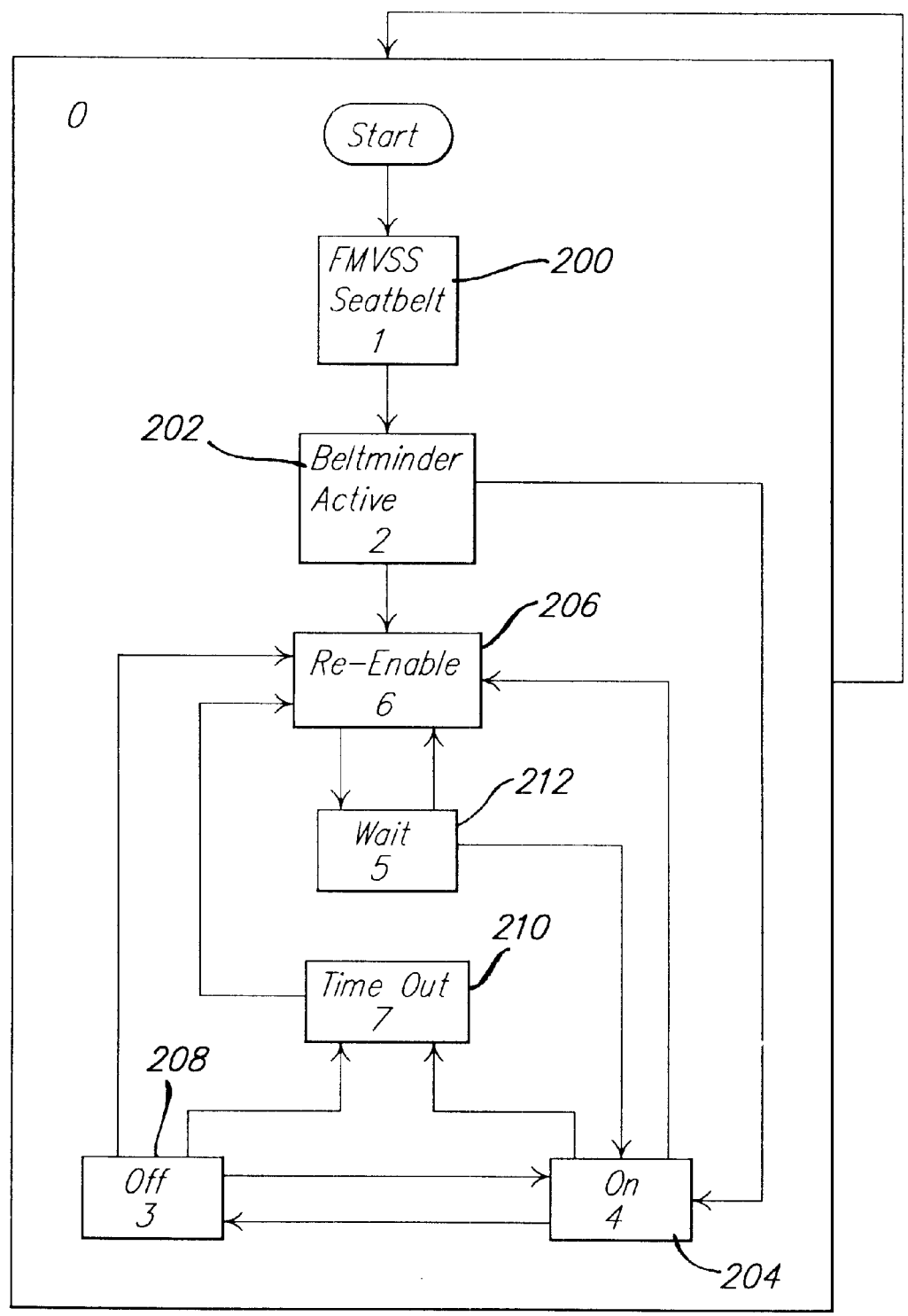
FIG. 4 is a logic diagram of a method, according to the present invention, of providing repeatable warnings for the secondary seat belt warning system of FIG. 3.

Referring to FIG. 4, the secondary seat belt warning system 110 includes a repeatable warning feature that will provide the occupant with secondary warnings throughout the duration of a drive cycle, any time after the standard federally mandated (FMVSS) seat belt warning period is over. As illustrated, a method, according to the present invention, for repeating secondary warnings for the secondary seat belt warning system 110 is shown. The method starts with the secondary warnings required off or inactive and advances to block 200. In block 200, the method includes the steps of providing the primary (FMVSS) warnings for a predetermined time period such as sixty seconds. For example, the generic electronic module 112 receives a signal that the driver occupant seat belt is unbuckled via the sensor 116 when the ignition is started and sends a signal to the indicators 122 and 124 to provide the primary warnings until the FMVSS timeout via a first timer (not shown). Once the first timer expires, the secondary warnings are enabled and the method starts a second timer (not shown) for a predetermined time such as twenty-five seconds. The method advances to block 202 and enables the secondary warnings. From block 202, the method may advance to block 204 and turns on or provides the secondary warnings if the second timer has expired, vehicle speed is greater than a predetermined speed such as three miles per hour, and the seat belt warning status is on. It should be appreciated that the term "seat belt warning status" is defined as a logical combination of driver and passenger occupant seat belt status. From block 202 to block 204, the method starts a third timer (not shown) for a predetermined time period such as six seconds, starts a fourth timer (not shown) for a predetermined time period such as five minutes, and turns the secondary warnings required on.

The method may advance from block 202 to block 206 and re-enable the secondary warnings if the second timer has expired and either the seat belt warning status is off, or the seat belt warning status is on and the vehicle speed is below a predetermined speed such as three miles per hour.

From block 204, the method may advance to block 206, previously described, if the seat belt warning status is off. The method sets the secondary warnings required to off. From block 204, the method may also advance to block 208 and turn off the secondary warnings if the second timer has expired. The method sets the secondary warnings required to off and starts the second timer for a predetermined time such as thirty seconds. The method may also advance from block 204 to block 210 and time-out if the fourth timer has expired. The method sets the secondary warnings required to off. From block 210, the method advances to block 206, previously described, if the seat belt warning status is off.

In block 208, the method may advance to block 204, previously described, if the second timer has expired. The method sets the secondary warnings required to on and starts the third timer for a predetermined time such as six seconds. The method may also advance from block 208 to block 206, previously described, if the seat belt warning status is off. The method sets the secondary warnings required to off. The method may further advance from block 208 to block 210, previously described, if the fourth timer has expired. The method sets the secondary warnings required to off.

In block 206, the method may advance to block 212 and waits if the seat belt warning status is on and the vehicle speed is greater than a predetermined speed such as three miles per hour. The method sets a delay timer at a predetermined time such as zero. From block 212, the method may advance to block 204, previously described, if the delay timer has expired, vehicle speed is greater than a predetermined speed such as three miles per hour, and the seat belt warning status is on. The method starts the third timer and fourth timer and sets the secondary warnings required to on. From block 212, the method may also advance to block 206 if the seat belt warning status is off or the vehicle speed is less than a predetermined speed such as three miles per hour. The method stops the delay timer. It should be appreciated that if the ignition status is off or the ignition status is accessory, the method sets the secondary warnings required to off and advances to start.

Referring to FIGS. 5 and 6, the secondary seat belt warning system 110 differentiates between a user that did not intend to use his/her seat belt during the present drive cycle versus a user who initially buckled and intended to use his/her seat belt for the present drive cycle, but later unbuckled and forgot to re-buckle his/her seat-belt. For the later user, new reminder or secondary warnings are provided. It should be appreciated that belt status, vehicle speed, and time are used to determine when to provide the additional reminder or secondary warnings.

As illustrated in FIG. 5, a method, according to the present invention, for classifying or qualifying a driver occupant as a driver seat belt user/non-user is shown. The method starts with a driver status as a user and advances to block 300 to initialize the seat belt warning system 110. In block 300, for example, if the secondary seat belt warning system 110 senses the driver seat belt status as buckled, the method starts a qualify driver timer and advances to block 302 to qualify the driver occupant. For example, the secondary seat belt warning system 110 checks the qualify driver timer to see if it is greater than a predetermined time period such as at least twenty seconds and the driver seat belt status as buckled or unbuckled, the method sets the driver status as a user or non-user. It should be appreciated that a driver occupant that never buckles their seat belt is defined as a user unless the secondary seat belt warning system 110 is indefinitely disabled.

In block 302, if the method determines that the qualify driver timer has expired and the driver seat belt status is buckled, the method sets the driver status to a user and advances to block 304. It should be appreciated that the secondary seat belt warning system 110 assigns a user status to a vehicle occupant that buckles their seat belt and remains buckled for the predetermined time. It should also be appreciated that secondary warnings are enabled for the driver occupant throughout the drive cycle, which is defined as the time ignition transitions to run to the time the ignition transitions to off. It should further be appreciated that at anytime the user becomes unbuckled, secondary warnings will occur if other conditions are satisfied as previously described.

In block 302, if the method determines that the driver seat belt status is unbuckled, the method sets the driver status to a non-user and advances to block 306. In block 306, the method qualifies or classifies the driver occupant as a non-user.

Additionally, the method may advance from block 306 back to block 302 or block 304. For example, if the driver occupant buckles the seat belt and the secondary seat belt warning system 110 is enabled for the driver occupant, the method starts the qualify driver timer and advances from block 306 to block 302 to re-qualify the driver occupant. If the secondary seat belt warning system 110 is enabled for the driver occupant, the method sets the seat belt status to user and advances to block 304 to qualify or classify the driver occupant as a user.

In block 304, if the driver occupant buckles the seat belt, the method starts the qualify driver timer and advances from block 304 to block 302 to re-qualify the driver occupant. It should be appreciated that if the secondary seat belt warning system 110 is disabled for the driver occupant, the method qualifies or classifies the driver status as a non-user. It should also be appreciated that the secondary seat belt warning system 110 can dynamically change the status of an occupant by continually monitoring the seat belt buckle and applying the classification rules at any time during a drive cycle.

As illustrated in FIG. 6, a method, according to the present invention, for qualifying or classifying a passenger occupant as a passenger seat belt user/non-user is shown. The method starts with a passenger status as a user and advances to block 400 to initialize the seat belt warning system 110. In block 400, for example, if the secondary seat belt warning system 110 senses the passenger seat belt status as buckled, the method starts a qualify passenger timer and advances to block 402 to qualify the passenger occupant. For example, the secondary seat belt warning system 110 checks the qualify passenger timer to see if it is greater than a predetermined time period such as at least twenty seconds and passenger seat belt status as buckled or unbuckled. It should be appreciated that a passenger occupant that never buckles their seat belt is defined as a user unless the secondary seat belt warning system 110 is indefinitely disabled.

In block 402, if the method determines that the qualify passenger timer has expired or is greater than the predetermined time period and the passenger seat belt status is buckled, the method sets the passenger status to a user and advances to block 404. In block 404, the method qualifies or classifies the passenger occupant as a user. For example, if the occupant classification system 166 determines that the passenger occupant is not present, the method classifies the passenger occupant as a non-user. It should be appreciated that the secondary seat belt warning system 110 assigns a user status to a passenger occupant that buckles their seat belt and remains buckled for the predetermined time. It should also be appreciated that secondary warnings are enabled for the passenger occupant throughout the drive cycle. It should further be appreciated that at anytime the passenger occupant becomes unbuckled, secondary warnings will occur if other conditions are satisfied as previously described.

In block 402, if the method determines that the passenger seat belt status is unbuckled, the method sets the passenger status to a non-user and advances to block 406. In block 406, the method qualifies or classifies the passenger occupant as a non-user.

Additionally, the method may advance from block 406 back to block 402. For example, if the passenger seat belt status is buckled and the secondary seat belt warning system 110 is enabled for the passenger occupant and the passenger occupant is present via the occupant classification system 166, the method starts the qualify passenger timer and advances from block 406 to block 402 to re-qualify the passenger occupant.

Further, the method may advance from block 406 back to block 404. For example, if the secondary seat belt warning system 110 is enabled for the passenger occupant and the passenger occupant is present via the occupant classification system 166, the method advances from block 406 to block 404 and qualifies or classifies the passenger occupant as a user. It should be appreciated that the secondary seat belt warning system 110 can dynamically change the status of a passenger occupant by continually monitoring the seat belt buckle and applying the classification rules at any time during a drive cycle.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A secondary seat belt warning system for a motor vehicle comprising:
    at least one control module for activating at least one secondary warning signal;
    a driver seat belt sensor for producing an input signal indicative of a state of a driver seat belt between a buckled and unbuckled condition;
    at least one passenger seat belt sensor for producing an input signal indicative of a state of at least one passenger seat belt between a buckled and unbuckled condition; and
    said at least one control module communicating with said driver seat belt sensor and said at least one passenger seat belt sensor for activating a primary warning signal to alert a corresponding occupant of the motor vehicle if the state of the driver seat belt and the at least one passenger seat belt is the unbuckled condition for a first predetermined period of time and activating the at least one secondary warning signal to alert the corresponding occupant of the motor vehicle if the state of at least one of the driver seat belt and the at least one passenger seat belt is the unbuckled condition after expiration of the first predetermined period of time.

2. A secondary seat belt warning system as set forth in claim 1 including an audible indicator communicating with said at least one control module for indicating the at least one secondary warning signal.

3. A secondary seat belt warning system as set forth in claim 2 wherein said audible indicator comprises a loudspeaker.

4. A secondary seat belt warning system as set forth in claim 1 including a visual indicator communicating with said at least one control module for indicating the at least one secondary warning signal.

5. A secondary seat belt warning system as set forth in claim 1 wherein said visual indicator comprises a seat belt warning light.

6. A secondary seat belt warning system as set forth in claim 1 including an occupant classification system communicating with said at least one control module to determine whether an occupant is present in a passenger seat of the motor vehicle.

7. A secondary seat belt warning system as set forth in claim 6 wherein said occupant classification system includes a seat occupancy sensor cooperating with the passenger seat and communicating with said at least one control module to determine if the occupant is seated therein.

8. A method of producing a seat belt indicator signal indicative of an unbuckled condition of at least one vehicle seat belt comprising the steps of:

detecting a state of a vehicle ignition between an off position and an on position;

detecting a speed of the vehicle;

detecting a state of the at least one vehicle seat belt between a buckled and unbuckled condition;

producing a primary warning signal when the ignition run condition is detected and the seat belt unbuckled condition is detected for a first predetermined period of time; and producing a secondary warning signal when the ignition run condition is detected, the seat belt unbuckled condition is detected and the detected vehicle speed is above a predetermined threshold after expiration of the first predetermined period of time.

9. A method as set forth in claim 8 wherein said step of detecting comprises detecting a state of a driver seat belt between a buckled and unbuckled condition.

10. A method as set forth in claim 8 wherein said step of detecting comprises detecting a state of a passenger seat belt between a buckled and unbuckled condition.

11. A method as set forth in claim 10 including the step of detecting whether a passenger occupant is present in a passenger seat of the motor vehicle.

12. A method as set forth in claim 11 wherein said step of producing a secondary warning signal comprises producing an output signal and triggering a seat belt indicator when the ignition run condition is detected, the passenger seat belt unbuckled condition is detected, the passenger is present in the passenger seat, and the detected vehicle speed is above a predetermined threshold.

13. A method for qualifying an occupant as a user or non-user of a vehicle seat belt comprising the steps of:

initializing a status of an occupant as a user of a vehicle seat belt;

qualifying an occupant by detecting a state of the vehicle seat belt between a buckled and unbuckled condition and the status of the occupant;

classifying the occupant as a user if the state of the vehicle seat belt is the buckled condition for a predetermined time; and classifying the occupant as a non-user if state of the vehicle seat belt is the buckled condition and then the unbuckled condition within the predetermined time.

14. A method as set forth in claim 13 including step of starting a qualify timer and detecting a state of the qualify timer.

15. A method as set forth in claim 14 wherein said step of classifying the occupant as a user includes determining that the qualify timer has expired and the seat belt state is the buckled condition.

16. A method as set forth in claim 13 wherein said step of initializing a status of an occupant as a user of a vehicle seat belt comprises initializing a status of an occupant as a user of a vehicle driver seat belt.

17. A method as set forth in claim 13 wherein said step of initializing a status of an occupant as a user of a vehicle seat belt comprises initializing a status of an occupant as a user of a vehicle passenger seat belt.

18. A method for repeating secondary warnings for a secondary seat belt warning system of a motor vehicle includes the steps of:

waiting for a primary warning period to end;

enabling secondary warnings after the primary warning period has ended;

turning on the secondary warnings for a secondary warning period if the secondary warnings are enabled;

turning off the secondary warnings after the secondary warning period has ended; and re-enabling the secondary warnings after the secondary warnings have been turned off.

19. A method as set forth in claim 18 including the step of waiting to reactivate the secondary warnings if the secondary warnings have been re-enabled.

20. A method as set forth in claim 19 including the step of turning on the secondary warnings for a secondary warning period if the timer has expired and the secondary warnings are required.

\* \* \* \* \*